United States Patent
Kitamura

(10) Patent No.: US 7,883,248 B2
(45) Date of Patent: Feb. 8, 2011

(54) BICYCLE ILLUMINATION APPARATUS

(75) Inventor: Satoshi Kitamura, Osaka (JP)

(73) Assignee: Shimano Inc., Osaka (JP)

( * ) Notice: Subject to any disclaimer, the term of this patent is extended or adjusted under 35 U.S.C. 154(b) by 75 days.

(21) Appl. No.: 11/777,487

(22) Filed: Jul. 13, 2007

(65) Prior Publication Data

US 2008/0101079 A1 May 1, 2008

(30) Foreign Application Priority Data

Oct. 30, 2006 (JP) .............................. 2006-293922

(51) Int. Cl.
*B62J 6/00* (2006.01)
*H05B 37/02* (2006.01)
*B60Q 1/00* (2006.01)

(52) U.S. Cl. .................... 362/473; 362/475; 362/464; 362/192; 362/193; 315/78; 315/79; 315/307; 315/291

(58) Field of Classification Search ......... 362/473–476, 362/192–193, 464; 315/78–79, 185 R, 92, 315/193, 291, 307
See application file for complete search history.

(56) References Cited

U.S. PATENT DOCUMENTS

| | | | |
|---|---|---|---|
| 5,828,145 A | 10/1998 | Nakamura | |
| 6,418,041 B1* | 7/2002 | Kitamura | 363/125 |
| 7,311,164 B1* | 12/2007 | Kertes | 180/180 |
| 2005/0157510 A1* | 7/2005 | Uno | 362/473 |
| 2006/0072330 A1 | 4/2006 | Koharcheck et al. | |
| 2007/0257623 A1* | 11/2007 | Johnson et al. | 315/193 |
| 2007/0262724 A1* | 11/2007 | Mednik et al. | 315/125 |

FOREIGN PATENT DOCUMENTS

| | | |
|---|---|---|
| DE | 196 01 542 A1 | 7/1996 |
| EP | 1 604 891 A1 | 12/2005 |
| JP | H08-301162 A | 11/1996 |
| JP | 2005-329737 A | 12/2005 |
| JP | 2005-350064 A | 12/2005 |
| TW | 349515 | 1/1999 |
| TW | M274301 | 9/2005 |

* cited by examiner

*Primary Examiner*—Robert J May
(74) *Attorney, Agent, or Firm*—Global IP Counselors, LLP

(57) ABSTRACT

A bicycle illumination apparatus is provided with a plurality of light sources and a controller. The light sources include at least one light-emitting diode that emits light in accordance with an electrical output of a generator. The controller is configured to selectively control an electrical connection between the power generator and the light sources in accordance with a rotating state of the generator.

14 Claims, 6 Drawing Sheets

BICYCLE ILLUMINATION APPARATUS

CROSS-REFERENCE TO RELATED APPLICATIONS

This application claims priority under 35 U.S.C. §119 to Japanese Patent Application No. 2006-293922, filed Oct. 30, 2006. The entire disclosure of Japanese Patent Application No. 2006-293922 is hereby incorporated herein by reference.

BACKGROUND OF THE INVENTION

1. Field of the Invention

This invention generally relates to an illumination apparatus. More specifically, the present invention relates to a bicycle illumination apparatus capable of being connected to a power generator that generates electricity in accordance with the movement of the bicycle.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle.

Recently, bicycles have been provided with headlights, tail lights and other bicycle illumination devices that use light-emitting diodes in order to reduce problems with bulb burnout and the like. For example, such a bicycle illumination device is disclosed in Japanese Laid-Open Patent Application No. 2005-329737. In conventional illumination devices, the light-emitting diodes are often illuminated by electricity generated with a hub dynamo placed in a wheel. Two light-emitting diodes are provided and are connected in parallel to each other in opposite directions. The AC power outputted from the hub dynamo can thereby be used without being rectified.

In the case of a resistance load, such as that of a light bulb, the electric current flowing through the light bulb is generally proportional to a voltage, in accordance with Ohm's law. However, with the load of a light-emitting diode, an electric current rapidly begins to flow at about 2 to 4 volts. In the case of only one light-emitting diode, a certain output is obtained at a low rotational speed, but when the rotational speed increases, problems are encountered in that the rate of increase in output lowers and reaches a substantial plateau. Therefore, problems are encountered in that output is insufficient when the bicycle is ridden at high speeds.

One proposal for resolving these problems is to connect multiple light-emitting diodes in series. In cases in which light-emitting diodes are connected in series, output increases with a greater number of connected light-emitting diodes because the voltage at which matching is established with the light-emitting diodes (hereinafter referred to as matching voltage) increases as the speed of the bicycle increases; i.e., as the rotational speed of the power generator increases. However, the matching voltage decreases as the rotational speed decreases. Therefore, when a generator in which multiple light-emitting diodes are connected in series is operated, sufficient voltage might not be obtainable at low traveling speeds at which the low voltage is generated.

In view of the above, it will be apparent to those skilled in the art from this disclosure that there exists a need for an improved illumination apparatus. This invention addresses this need in the art as well as other needs, which will become apparent to those skilled in the art from this disclosure.

SUMMARY OF THE INVENTION

One object of the present invention is to provide a bicycle illumination apparatus having multiple light-emitting diodes with the output being optimizes in accordance with the rotational speed of a power generator.

The foregoing object can basically be attained according to a first aspect by providing an illumination apparatus that is powered by a generator that generates electricity in accordance with the movement of a bicycle. In accordance with the first aspect, the illumination apparatus comprises a plurality of light sources and a controller. The light sources include at least one light-emitting diode that emits light in accordance with an electrical output of a generator. The controller is configured to selectively control an electrical connection between the power generator and the light sources in accordance with a rotating state of the generator.

In this illumination apparatus, the connection between the power generator and the light sources is selectively controlled in accordance with the rotating state of the power generator. For example, only one light source is turned on when the power generator is rotating at low speeds, and more light sources are turned on as the power generator rotates faster. Sufficient output is thereby guaranteed during low speeds at which the matching voltage is low, and sufficient output can also be obtained during high speeds at which the matching voltage is high. The number of lit light sources can be increased or reduced in accordance with the rotating state, because the connection with the light sources is selectively controlled in accordance with the rotating state of the power generator. Therefore, an optimum output is obtained in accordance with the rotating state of the power generator.

The bicycle illumination apparatus according to a second aspect is the apparatus according to the first aspect, further comprising a plurality of switches arranged to selectively turn the light sources on and off, and rotating state detector arranged to detect the rotating state of the generator, with the controller being further configured to selectively control the electrical connection between the generator and the light sources by selectively turning the switches on and off in accordance with the rotating state detected by the rotating state detector. In this case, since the rotating state is detected and the switches are turned on and off to selectively control the connection between the power generator and the light sources in accordance with the detection results, control is more precise, and a more optimal output is obtained in accordance with the rotating state of the power generator.

The bicycle illumination apparatus according to a third aspect is the apparatus according to the first or second aspect, wherein each of the light sources has two light-emitting diodes connected in parallel with different polarities. In this case, since two light-emitting diodes constituting one light source are connected in parallel so as to have different polarities, the light-emitting diodes are disposed so as to face in opposite directions. Therefore, even though an alternating current is outputted from the power generator, AC power can be used without being rectified.

The bicycle illumination apparatus according to a fourth aspect is the apparatus according to the first or second aspect, further comprising a rectifier circuit arranged for rectifying AC power of the generator, with each of the light sources having a single light-emitting diode that is illuminated with rectified electricity. In this case, since the light sources are each configured from a single light-emitting diode, the configuration of the light sources is simplified, and the illumination apparatus can be reduced in size.

The bicycle illumination apparatus according to a fifth aspect is the apparatus according to any of the second through fourth aspects, wherein the controller is further configured to control the switches so that more of light-emitting diodes that are turned on in sequence from a single light source in accordance with an increase in rotational speed as obtained from the rotating state detected by the rotating state detector. In this case, since the light-emitting diodes of the light sources turn on in sequence and the lit light-emitting diodes increase in number in accordance with the speed of the bicycle, the optimum output is obtained in accordance with the speed of the bicycle.

The bicycle illumination apparatus according to a sixth aspect is the apparatus according to the fifth aspect, wherein the controller is further configured to control the switches so that the light sources turn on one by one in sequence in accordance with the increase in the rotational speed detected by the rotating state detector. In this case, since the lit light sources increase in number one by one as the speed increases, needless power consumption can be reduced.

According to the present invention, since the connection with the light sources is selectively controlled according to the rotating state of the power generator, the number of illuminated light sources can be increased or reduced according to the rotating state. Therefore, the optimum output is obtained according to the rotating state of the power generator.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
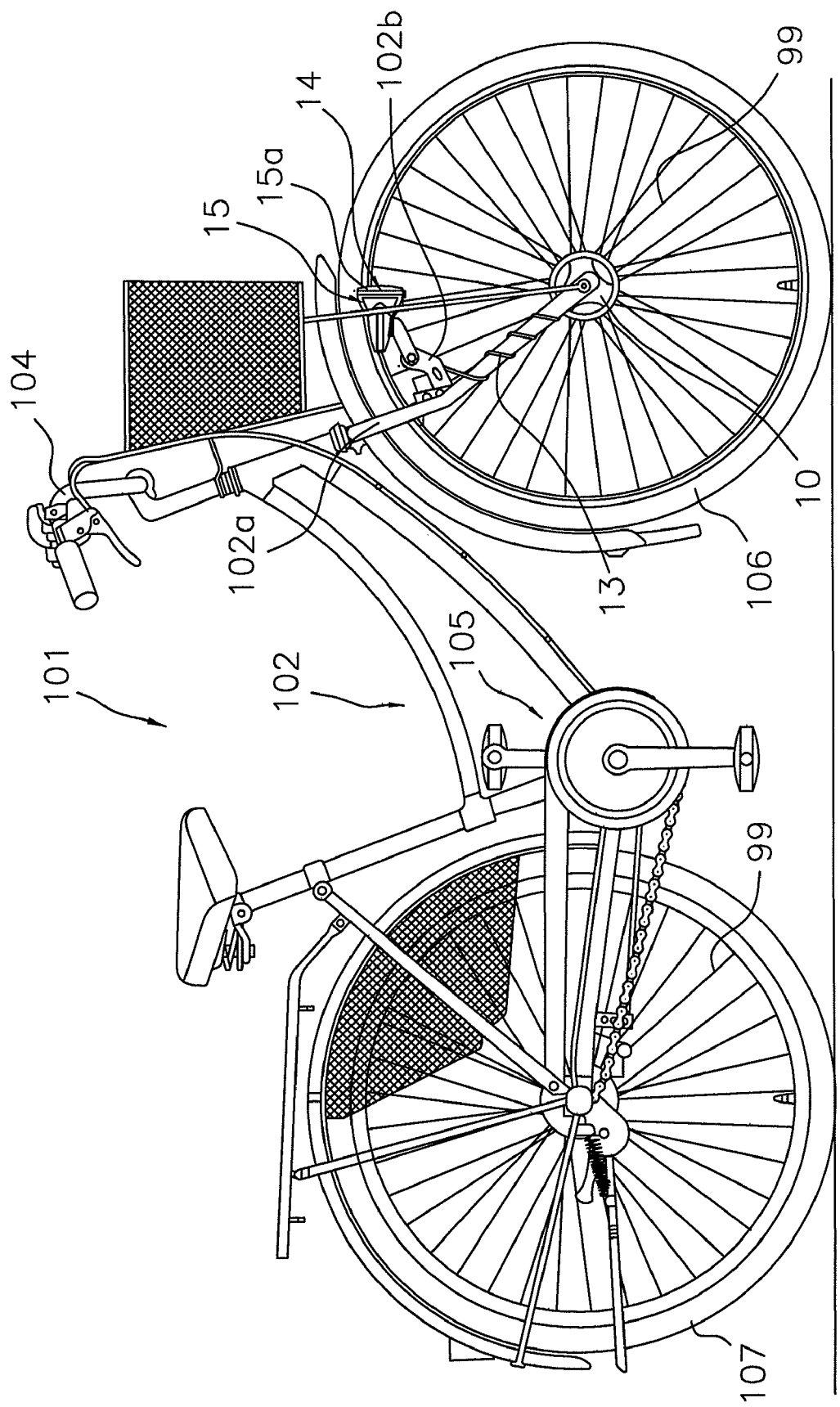
FIG. 1 is a side elevational view of a bicycle equipped with a bicycle illumination apparatus that is powered by a claw-pole electric generator (hub dynamo) in accordance with a first embodiment of the present invention.

Referring initially to FIG. 1, a bicycle 1 is illustrated in accordance with a first embodiment of the present invention. The bicycle 1 includes a frame 102, a handlebar 104, a drive unit 105, a front wheel 106 and a rear wheel 107. The frame 102 includes a front fork 102a. The drive unit 105 includes a chain, pedals and the like. The front and rear wheels 106 and 107 are bicycle wheels having a plurality of spokes 99.

The front wheel 106 has a hub dynamo 10 with an AC output power generation unit 19 (electric generator) that is incorporated therein. Electricity generated by the bicycle hub dynamo 10 is supplied to an external headlight 14 via a power source wire or line 13. The hub dynamo 10 according to the first embodiment is mounted in the front wheel 106 of the bicycle and at the distal end of the front fork 102a.

Figure 2:
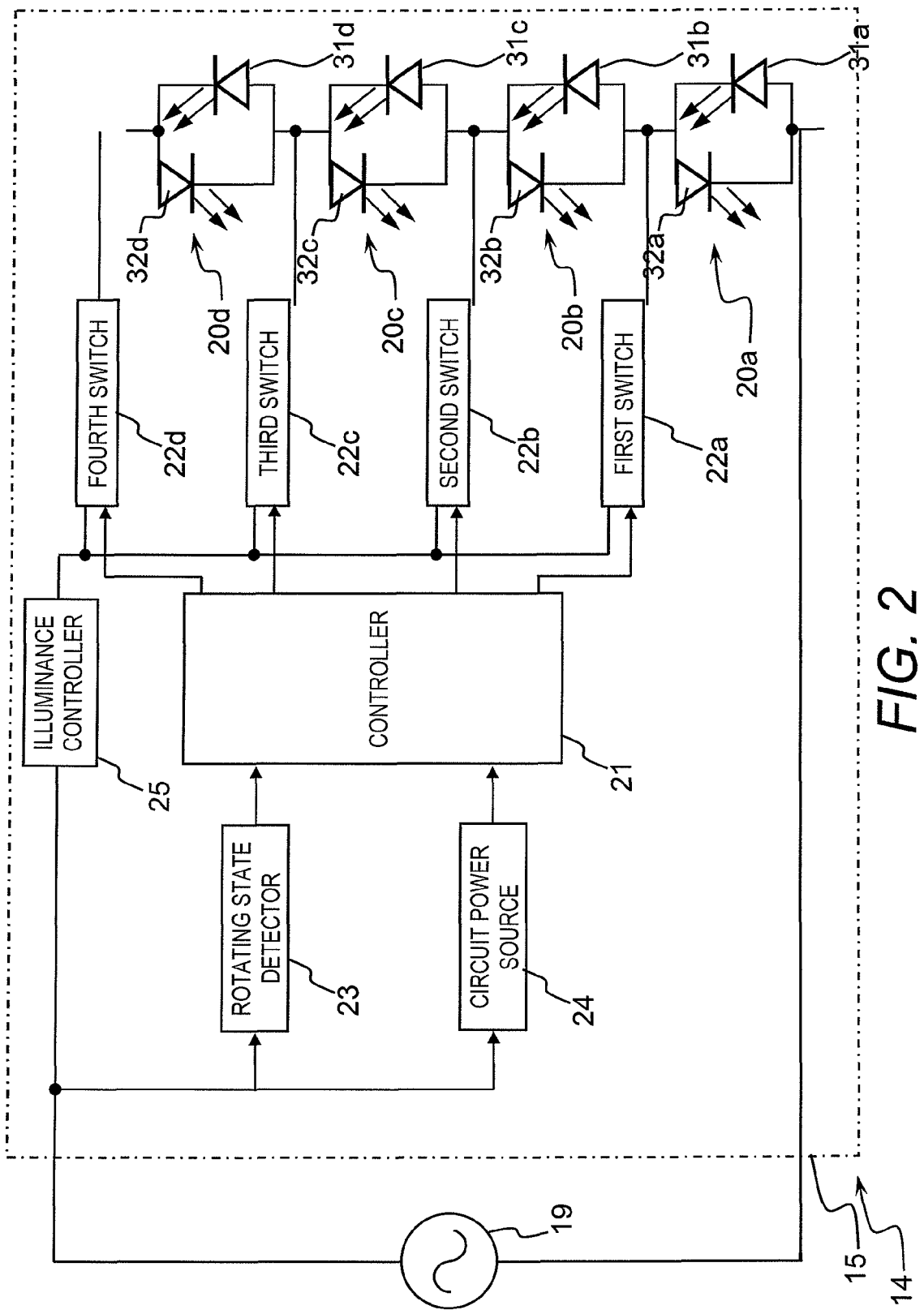
FIG. 2 is a control block diagram for controlling the illumination apparatus in accordance with the first embodiment.

The headlight 14, which is the bicycle illumination apparatus according to the first embodiment of the present invention, is fixed to a lamp stay 102b provided to the front fork 102a. The headlight 14 has a lens 15a on the front, and a lamp case 15 fixed to the lamp stay 102b. The headlight 14 includes a plurality (four, for example) of light sources 20a to 20d and a switching controller (one example of the controller) 21. The light sources 20a to 20d are disposed inside the lamp case 15. The switching controller 21 is configured to selectively control an electrical connection between power generation unit 19 and the light sources 20a to 20d in accordance with the rotating state of power generation unit 19, as shown in FIG. 2. The headlight 14 further includes first to fourth switches 22a to 22d, a rotating state detector 23, a circuit power source 24 and an illuminance controller 25. The switches 22a to 22d are arranged to selectively turn the light sources on and off. The rotating state detector 23 arranged to detect the rotating state of the power generation unit 19 (electric generator). The circuit power source 24 is arranged to supply DC power having a specific voltage to the switching controller 21. The illuminance controller 25 collectively turns the light sources 20a to 20d on and off in accordance with the brightness (illuminance) of the surroundings of the bicycle 101.

The illuminance controller 25 is disposed between power generation unit 19 and the light sources 20a to 20d. The illuminance controller 25 turns the light sources 20a through 20d off during bright conditions in which the surroundings are bright, such as daytime, for example, and turns light sources 20a to 20d on during dark conditions when the surroundings are dark, such as nighttime, for example.

The light sources 20a to 20d are connected in series. The light sources 20a to 20d each have two light-emitting diodes 31a to 31d and 32a to 32d that emit light in accordance with the AC output of power generation unit 19. The light-emitting diodes 31a to 31d and 32a to 32d emit high-intensity white light of about 3 W and 700 mA, for example. The light-emitting diodes 31a to 31d and 32a to 32d, respectively, are connected in parallel so as to have different polarities. Specifically, the anodes of the light-emitting diodes 31a to 31d are connected to the cathodes of the light-emitting diodes 32a to 32d, the cathodes of the light-emitting diodes 31a to 31d are connected to the anodes of the light-emitting diodes 32a to 32d, and the light-emitting diodes 31a to 31d and 32a to 32d are disposed facing opposite directions. The AC output from the power generation unit 19 can thereby be used without being rectified to a direct current.

The switching controller 21 has, e.g., a microcomputer having a CPU, a RAM, a ROM, and an input/output I/F. The switching controller 21 switches the connection between power generation unit 19 and the light sources 20a to 20d depending on whether the first to fourth switches 22a to 22d are turned on or off. The switching is performed in accordance with the rotating state as detected by the rotating state detector 23.

The first to fourth switches 22a to 22d are disposed between the illuminance controller 25 and the light sources 20a to 20d. Specifically, each of one ends of the first to fourth switches 22a to 22d is connected to one end of power generation unit 19 via the illuminance controller 25 without interposing any of the light sources 20a to 20d between each of the one ends of the first to fourth switches 22a to 22d and the one end of power generation unit 19. Furthermore, a first connecting portion directly connected to the other end of the first switch 22a connects the light source 20a with the light source 20b, a second connecting portion directly connected to the other end of the second switch 22b connects the light source 20b with the light source 20c, a third connecting portion directly connected to the other end of the third switch 22c connects the light source 20c with the light source 20d, and the fourth switch 22d is connected to the end of the light source 22d. The illuminance controller 25 is connected to one end of power generation unit 19. The end of the light source 20a is connected to the other end of power generation unit 19. The first to fourth switches 22a to 22d are turned on and off by the switching controller 21. The light source 20a lights up when only the first switch 22a is turned on, the light sources 20a and 20b light up when only the second switch 22b is turned on, the light sources 20a to 20c light up when only the third switch 22c is turned on, and all of the light sources 20a to 20d light up when only the fourth switch 22d is turned on.

The rotating state detector 23 is connected to one end of power generation unit 19. From the output of power generation unit 19, the rotating state detector 23 generates, e.g., pulse signals having multiple pulses per rotation of power generation unit 19, and outputs these pulse signals to the switching controller 21. The switching controller 21 calculates the speed V of the bicycle 101 from these pulse signals.

The circuit power source 24 is connected to one end of power generation unit 19. The circuit power source 24 rectifies the AC output of power generation unit 19 to a direct current, converts the output, e.g., to a specific constant DC voltage of about 3 to 5 volts, and supplies this voltage to the switching controller 21.

Figure 4:
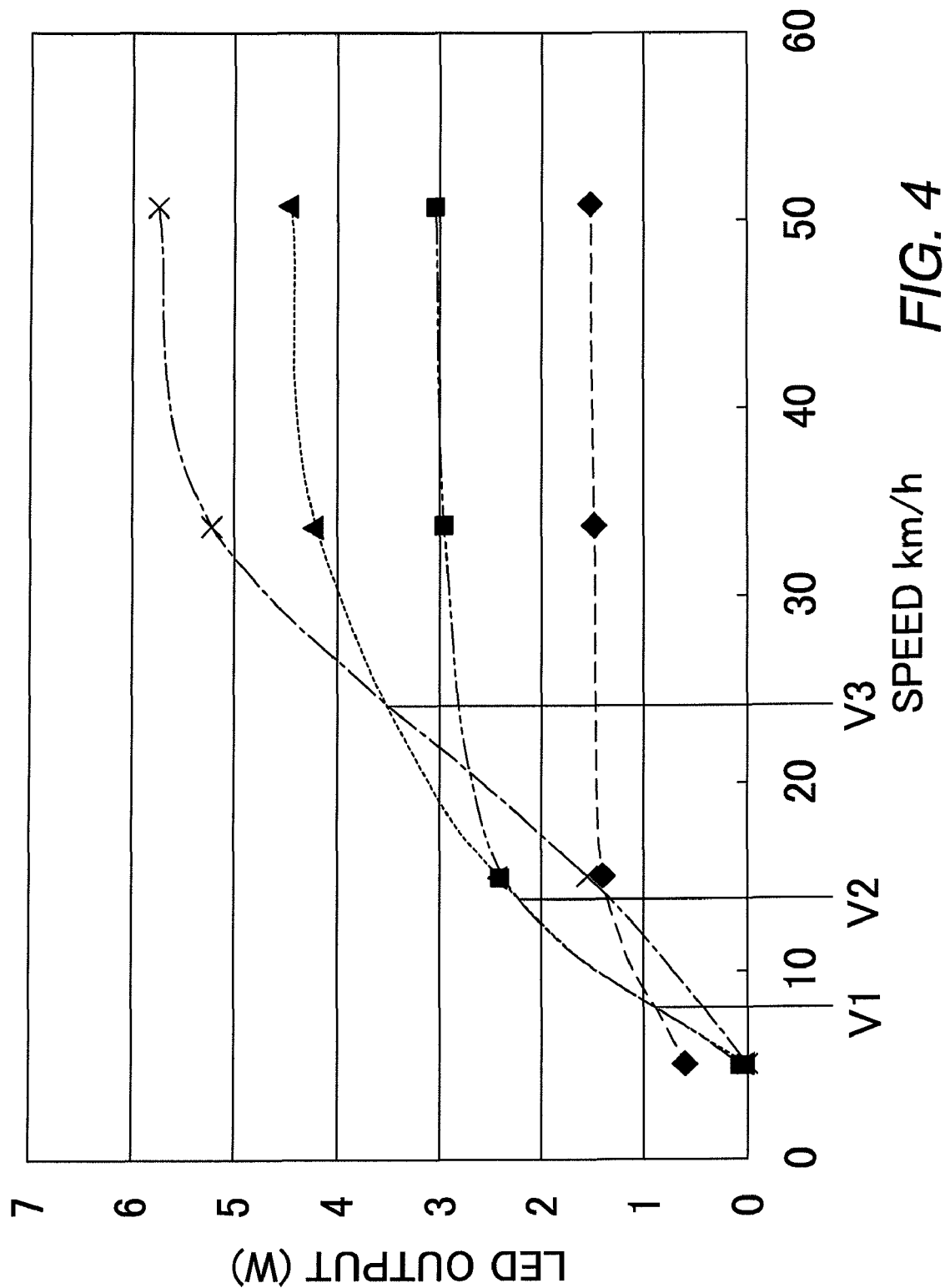
FIG. 4 is a graph showing output curves for the light-emitting diodes connected in series.

FIG. 4 shows an output curve of the light-emitting diodes 31a to 31d and 32a to 32d in a case in which the number of connections between the light sources 20a to 20d is varied, wherein the vertical axis represents the output (W) of the light-emitting diodes 31a to 31d and 32a to 32d, and the horizontal axis represents the speed (km/h) of the bicycle 101. In FIG. 4, a long-dashed line with black diamonds is used to show the output curve for a case in which only one light source is connected to power generation unit 19, and a double-dotted line with black squares is used to show the output curve for a case in which two light sources connected in series are connected to power generation unit 19. A short-dashed line with black triangles is used to show the output curve for a case in which three light sources connected in series are connected to power generation unit 19, and a single-dotted line with X symbols is used to show the output curve for a case in which four light sources connected in series are connected to power generation unit 19.

The output at high speeds gradually increases with increased number of light-emitting diodes connected in series, as shown in FIG. 4. However, the output at low speeds gradually decreases. In view of this, in the present embodiment, the switching controller 21 selectively controls the number of lit light sources 20a to 20d at speeds V1 through V3, which are disposed proximal to positions in which the output curves for different numbers of light sources intersect each other. The optimum output corresponding to speed can thereby be obtained.

Figure 3:
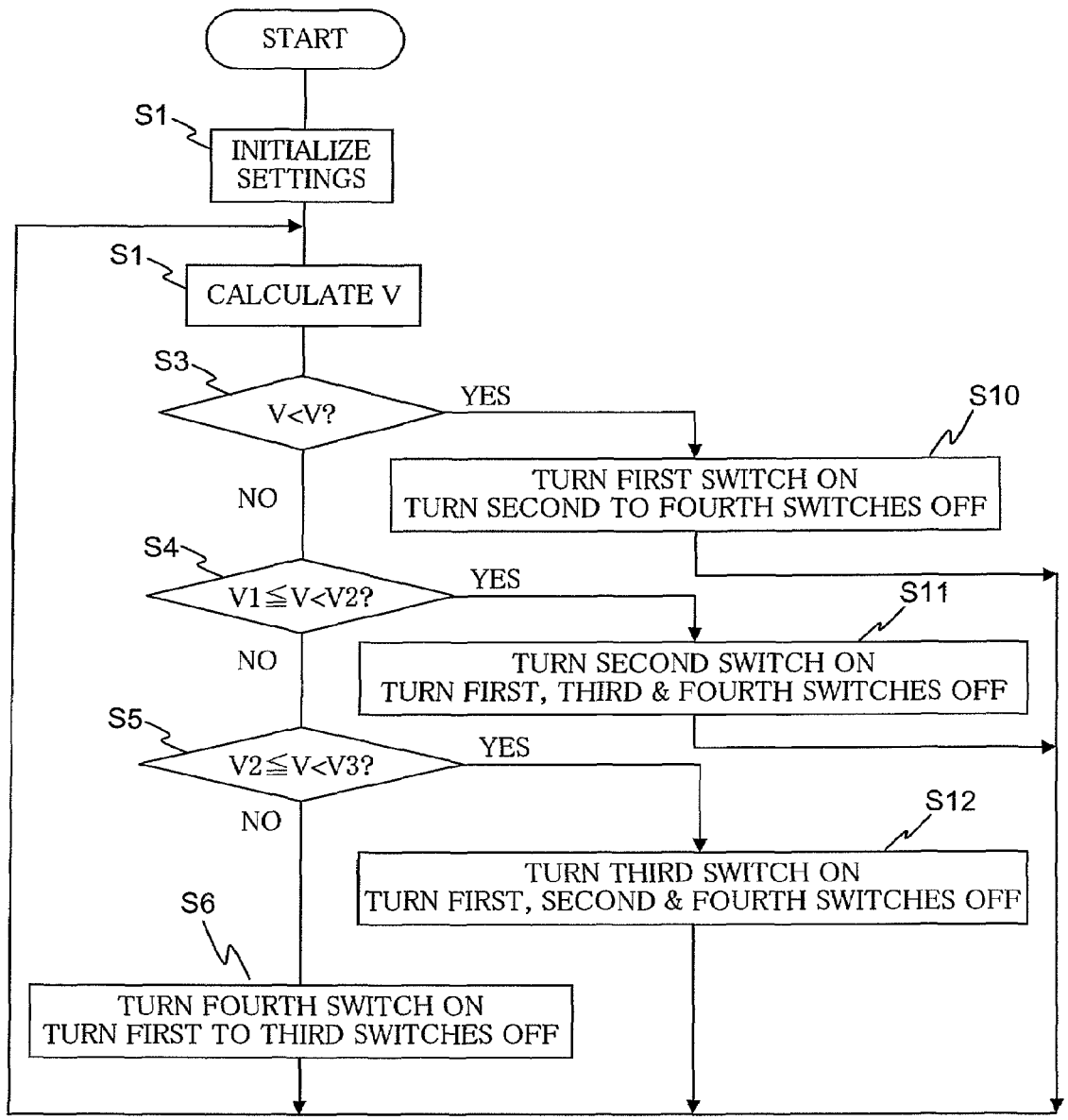
FIG. 3 is a control flowchart for controlling the illumination apparatus that is powered the electric generator (hub dynamo) in accordance with the first embodiment.

Next, the switching control operation of the switching controller 21 will be described with reference to the control flowchart shown in FIG. 3.

When the bicycle 101 is ridden and power is supplied to the switching controller 21, initial settings are established in step S1. In step S1, data on the wheel circumference, the switching speeds V1 through V3, and other such data is set. In step S2, the speed V of the bicycle 101 is calculated based on pulse signal data indicating the rotating state outputted from the rotating state detector 23. In step S3, a determination is made as to whether the speed V is less than the speed V1, i.e., the speed at which there is an intersection between the output curve for one light-emitting diode and the output curve for two light-emitting diode. In step S4, a determination is made as to whether the speed V is equal to or greater than the speed V1 and is less than the speed V2; i.e., the speed in the proximity of the intersection between the output curve for two light-emitting diodes and the output curve for three light-emitting diodes. In step S5, a determination is made as to whether the speed V is equal to or greater than the speed V2 and is less than the speed V3; i.e., the speed in the proximity of the intersection between the output curve for three light-emitting diodes and the output curve for four light-emitting diodes.

In cases in which the speed V is less than the speed V1, the process advances from step S3 to step S10. In step S10, only the first switch 22a is turned on, the second to fourth switches 22b to 22d are turned off, and the process returns to step S2. The light source 20a is thereby lit. In cases in which the speed V is equal to or greater than the speed V1 and is less than the speed V2, the process advances from step S4 to step S11. In step S11, only the second switch 22b is turned on; the first, third, and fourth switches 22a, 20c and 22d are turned off; and the process returns to step S2. The light sources 20a and 20b are thereby lit.

In cases in which the speed V is equal to or greater than the speed V2 and is less than the speed V3, the process advances from step S5 to step S12. In step S12, only the third switch 22c is turned on; the first, second, and fourth switches 22b through 22d are turned off; and the process returns to step S2. The light sources 20a through 20c are thereby lit. In cases in which the speed V is equal to or greater than the speed V3, the process advances from step S5 to step S6. In step S6, only the fourth switch 22d is turned on, and the first through third 22a through 22c are turned off. All four light sources 20a to 20d are thereby lit, and the process returns to step S2.

Figure 5:
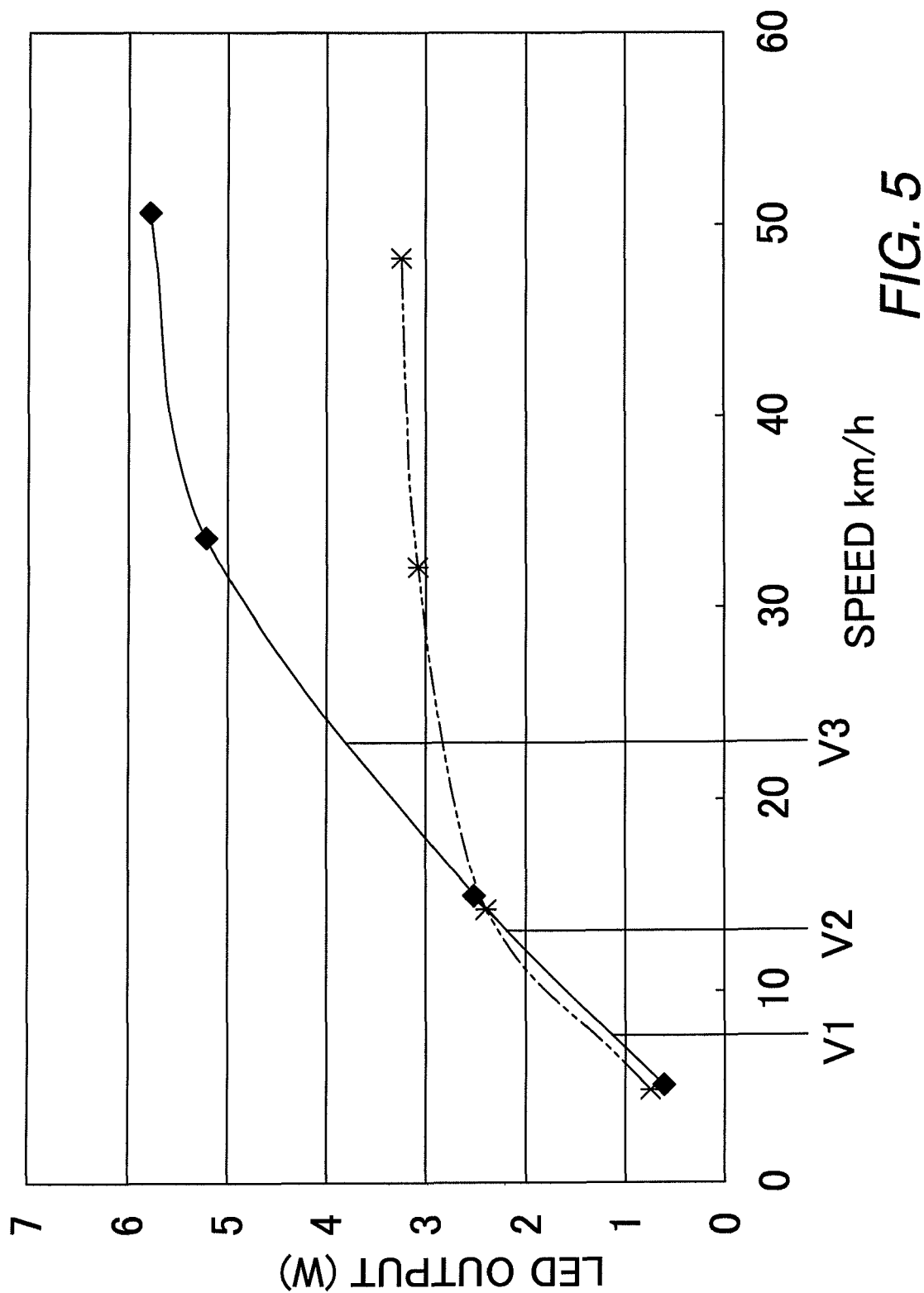
FIG. 5 is a graph showing output curves for the illumination apparatus in accordance with one embodiment.

FIG. 5 shows output curves for a case in which the light sources 20a to 20d are selectively controlled in this manner. In FIG. 5, a solid line with black diamonds is used to show an output curve of a case in which the light sources are selectively controlled, and a double-dotted line with asterisk symbols is used to show an output curve of a case in which a 15-ohm light bulb is used.

As is clear from a comparison of FIGS. 4 and 5, output is higher at high speeds in comparison with a case in which a single light-emitting diode is used, output is higher at high and low speeds in comparison with a case in which two diodes are used, output is higher at high and low speeds in comparison with a case in which three diodes are used, and output is higher at low speeds in comparison with a case in which four diodes are used.

In this headlight 14, only one light source 20a is turned on when power generation unit 19 is rotating at low speeds, and more light sources are turned on as the power generator rotates faster. Sufficient output is thereby guaranteed during low speeds at which the matching voltage is low, and sufficient output can also be obtained during high speeds at which the matching voltage is high. The connection with the light sources 20a to 20d is selectively controlled in accordance with the rotating state of power generation unit 19, and the number of lit light sources 20a to 20d can therefore be increased or reduced in accordance with the rotating state. Accordingly, the optimum output is obtained in accordance with the rotating state of power generation unit 19.

Second Embodiments

Figure 6:
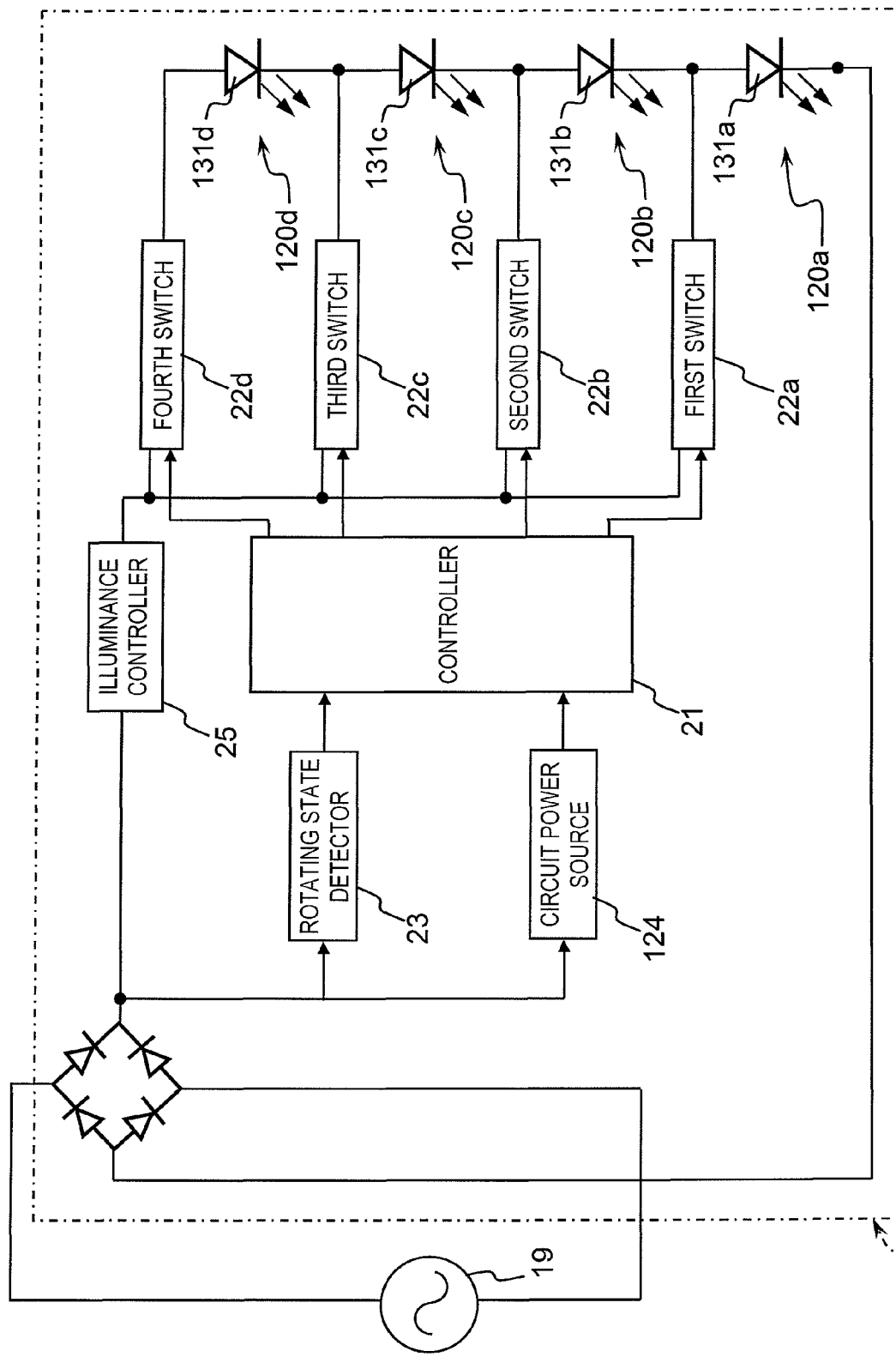
FIG. 6 is a control block diagram, similar to FIG. 2, for controlling the illumination apparatus in accordance with a second embodiment.

In the first embodiment, two light-emitting diodes connected in parallel were connected in parallel so that the light sources 20a to 20d had different polarities, and the light sources 20a to 20d were lit using the unaltered AC output of power generation unit 19. However, in the second embodiment, the headlight 114 is provided with a rectifier circuit 126 for rectifying AC power to a direct current, as shown in FIG. 6.

The rectifier circuit 126 is disposed between the illuminance controller 25 and one end of power generation unit 19. The rectifier circuit 126 is configured from a full-wave rectifier circuit that forms a bridge connection between the four diodes. A circuit power source 124 does not have a rectifying function, but has a constant-voltage function for converting direct current to a specific voltage.

Light sources 120a to 120d are connected in series with each of the light sources 120a to 120d having a single light-emitting diode 131a to 131d, respectively. The anodes of these light-emitting diodes 131a through 131d are connected to switches 22a to 22d, respectively.

The switching controller 21 performs the same manner of control as in the first embodiment. Specifically, only the first switch 22a is turned on when the speed V is less than the speed V1, only the second switch 22b is turned on when the speed V is equal to or greater than the speed V1 and less than V2, only the third switch 22c is turned on when the speed V is equal to or greater than the speed V2 and less than V3, and only the fourth switch 22d is turned on when the speed V is equal to or greater than the speed V3. The number of light sources turned on one by one in sequence beginning with the light source 120a is thereby increased in accordance with the speed.

In this case, since the light sources 120a through 120d are each configured from a single light-emitting diode 131a through 131d, the configuration of the light sources 120a through 120d is simplified, and the headlight 114 can be reduced in size.

Other Embodiments

In the previous embodiments, an illuminance controller was provided and the light sources were turned on and off in accordance with illuminance, but another option is to omit an illuminance controller and to keep the light sources constantly lit. Yet another option is for an illuminance sensor to be connected to the switching controller, and for the switching controller to turn the light sources on and off in accordance with illuminance.

In the previous embodiments, the speed of the bicycle was calculated and switching controlled on the basis of rotating-state detection results, but switching control may also be performed using the rotational speed of power generation unit 19, which is the rotating state of power generation unit 19. Another option is to separately provide a speed sensor for sensing the speed of the bicycle, and to perform switching control using the sensed output as the rotating state of the power generator.

In the previous embodiments, a headlight was used as an example of a bicycle illumination apparatus, but the present invention can also be applied to a tail lamp or a position lamp that flashes to show the position of the bicycle.

In the previous embodiments, an example was used in which the headlight was mounted on the front fork 102a, but the bicycle illumination apparatus may be mounted anywhere as long as it can be mounted on the bicycle.

In the previous embodiments, the hub dynamo 10 was used as an example of power generation unit 19, but the power generator connected to the present invention is not limited to this option alone. The present invention can also be connected to a rim dynamo, a power generator disposed between the frame and the spokes of the wheel, or a power generator disposed on the outside of the spokes of the wheel.

The number of light sources is not limited to four, and any number of light sources may be used as long as more than one lamp is used. Nor is the number of switches limited to four, and the number of switches can be arbitrarily set in accordance with the number of light sources and their connection.

In the previous embodiments, the light sources were connected in series, but in cases in which four light sources are used, another option is to selectively control between a parallel connection of four light sources, a series connection of two pairs of light sources that are connected in parallel, and a series connection of four light sources. In this case, the electric current flowing to the light-emitting diodes is much weaker in the latter two configurations in which parallel connections are added than in the former configuration in which the light sources are connected in series.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle illumination apparatus comprising:
   a plurality of light sources connected in series, each of the light sources Including at least one light-emitting diode that emits light in accordance with an electrical output of a generator that generates electricity in accordance with the movement of the bicycle, adjacent ones of the light sources being connected in series with each other through an electrical connection;

a plurality of switches arranged to selectively turn the light sources on and off, the switches being disposed in parallel with each other with respect to the generator, one of the switches being directly connected to the electrical connection between the adjacent ones of the light sources, the one of the switches being disposed between the generator and the electrical connection between the adjacent ones of the light sources; and a controller configured to selectively control an electrical connection between the generator and the light sources in accordance with a rotating state of the generator, the controller selectively turning on only one of the switches at a time to activate a different number of the light sources up to all of the light sources when the rotating state of the generator reaches a predetermined state, wherein the predetermined state is when a total output of the light sources that are serially connected to the generator after activating the different number of the light sources is equal to a total output of the light sources that have been serially connected to the generator before activating the different number of the light sources.

2. The bicycle illumination apparatus according to claim 1, further comprising a rotating state detector arranged to detect the rotating state of the generator, and the controller being further configured to selectively control the electrical connection between the generator and the light sources by selectively turning the switches on and off in accordance with the rotating state detected by the rotating state detector.

3. The bicycle illumination apparatus according to claim 2, wherein the controller is further configured to control the switches so that more of light-emitting diodes that are turned on in sequence from a single light source in accordance with an increase in rotational speed as obtained from the rotating state detected by the rotating state detector.

4. The bicycle illumination apparatus according to claim 3, wherein the controller is further configured to control the switches so that the light sources turn on one by one in sequence in accordance with the increase in the rotational speed detected by the rotating state detector.

5. The bicycle illumination apparatus according to claim 2, wherein each of the light sources has two light-emitting diodes connected in parallel with different polarities.

6. The bicycle illumination apparatus according to claim 2, further comprising a rectifier circuit arranged for rectifying AC power of the generator, with each of the light sources having a single light-emitting diode that is illuminated with rectified electricity.

7. The bicycle illumination apparatus according to claim 1, wherein each of the light sources has two light-emitting diodes connected in parallel with different polarities.

8. The bicycle illumination apparatus according to claim 7, wherein the controller is further configured to control the switches so that more of light-emitting diodes that are turned on in sequence from a single light source in accordance with an increase in rotational speed as obtained from the rotating state detected by the rotating state detector.

9. The bicycle illumination apparatus according to claim 1, further comprising a rectifier circuit arranged for rectifying AC power of the generator, with each of the light sources having a single light-emitting diode that is illuminated with rectified electricity.

10. The bicycle illumination apparatus according to claim 1, further comprising a hub dynamo with the generator disposed within the hub dynamo.

11. The bicycle illumination apparatus according to claim 1, wherein a particular one of the light sources is always activated by turning on any one of the switches.

12. The bicycle illumination apparatus according to claim 11, wherein the controller is further configured to control the switches so that the light sources are activated one by one in sequence from the particular one of the light sources in accordance with an increase in rotational speed as obtained from the rotating state of the generator.

13. The bicycle illumination apparatus according to claim 1, wherein one end of any one of the switches is connected to one end of the generator without interposing any one of the light sources therebetween.

14. The bicycle illumination apparatus according to claim 1, wherein a particular one of the switches that is turned on to activate all of the light sources is connected in series to the generator and all of the light sources.

* * * * *